United States Patent Office
2,864,504
Patented Dec. 16, 1958

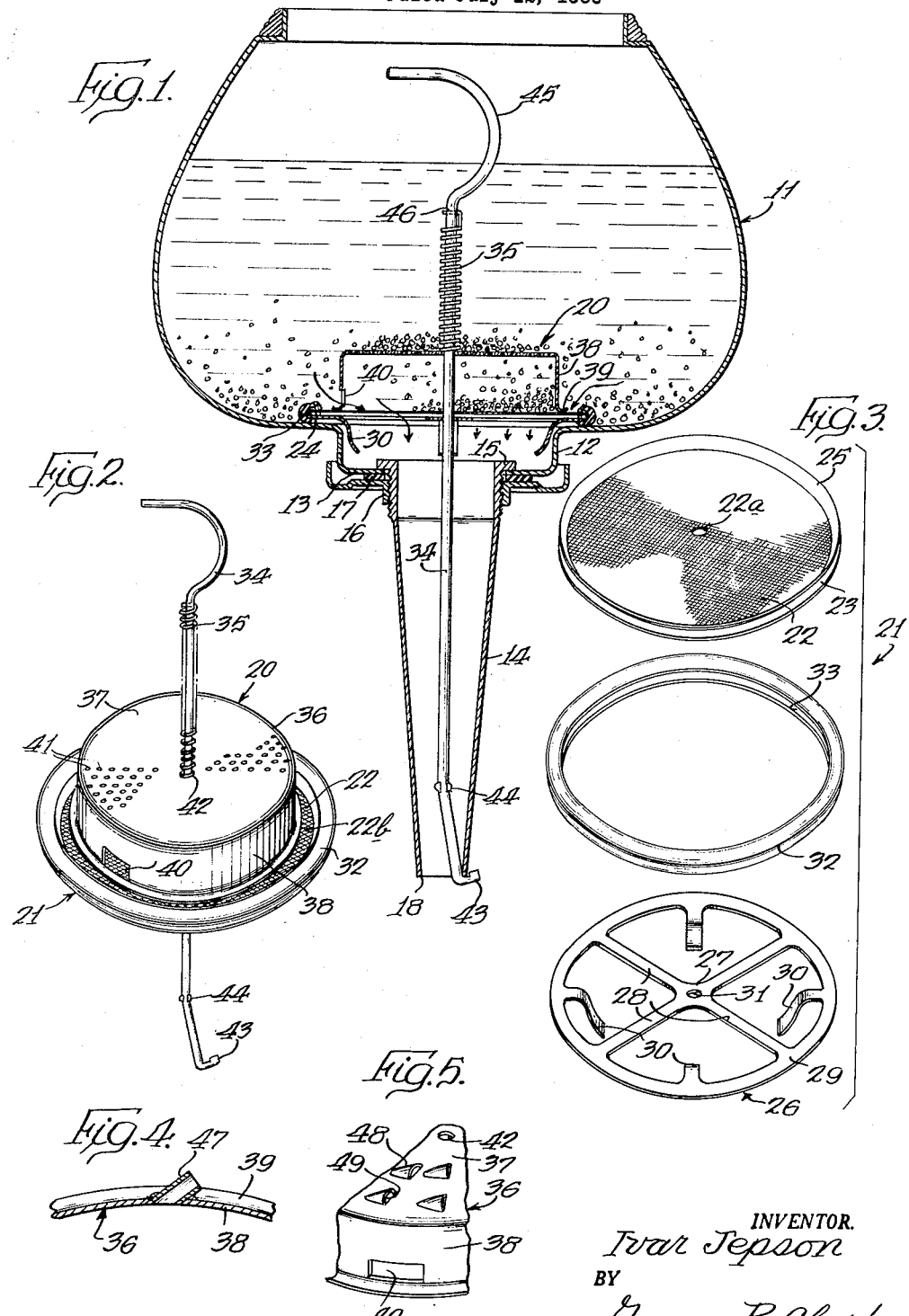

2,864,504

COFFEE MAKER FILTER

Ivar Jepson, Oak Park, Ill., assignor to Sunbeam Corporation, Chicago, Ill., a corporation of Illinois Application July 12, 1955, Serial No. 521,593

7 Claims. (Cl. 210—238)

The present invention relates generally to filters and more specifically to filters of the type employed in vacuum-type coffee makers.

In coffee makers of the vacuum type, there is usually a lower vessel within which water is heated and an upper vessel within which the coffee grounds to be infused are placed. A filter is necessary between the two vessels to permit the water first to move from the lower to the upper vessel and then to permit the coffee liquor to return to the lower vessel while retaining the coffee grounds in the upper vessel at all times. There are several general types of filters which are employed between the upper and lower vessels of the coffee maker. One of these types of filters employs a screen or membrane of porous material through which the coffee liquor is permitted to pass while retaining the grounds in the upper vessel.

It has been found that the prior art filters of this type are, in certain instances, very unsatisfactory or even inoperative. There seem to be two factors which contribute to the improper operation of the porous or screen type filter. One of these factors is a function of the fineness of the coffee grind or the presence of powdered coffee in the coffee grounds. Inasmuch as the satisfactory operation of the porous type filter is dependent upon the many minute openings in the filter remaining relatively unobstructed, any material which tends to clog these openings and prevent the flow of the coffee liquor therethrough renders the filter ineffective. The degree of clogging of the openings varies considerably depending on the type of coffee and type of grind purchased. If a fairly course grind of coffee is employed which is free from finely ground or powdered coffee, the coffee liquor is permitted to pass freely through the screen of the filter. The reason for this rapid filtering action is that the course particles of ground coffee which settle on the filter screen are too large to have any substantial obstructing effect on the many small openings in the filter screen. In addition, the coffee liquor will pass more freely through the thick bed of coursely ground coffee which has settled in the area above the screen.

On the other hand, when the coffee is finely ground or powdered, the grounds tend to lodge in the minute openings in the filter screen and obstruct flow therethrough. Another retarding effect of the fine grind of coffee lies in the increased obstructing action of the bed of finely divided particles as compared to a bed of large particles. Thus, the finely ground coffee above the filter screen and in the filter screen openings tends to increase the filtering time required. In some instances the filtering action is simply slowed down, while in other cases it is almost stopped entirely.

The nature of the water employed in making the coffee has also been found to affect the filtering time when using a porous type filter. Experimentation has revealed that minerals contained in the water in certain areas combine with coffee oils to coat the porous filter with a light, gelatin-like substance which greatly slows the filtering action. It would be desirable, therefore, if some means could be provided which would improve the action of porous or screen type filters by eliminating or reducing the effect of the above-described phenomena caused by powdered coffee and mineral containing water. Since the screen type filter is both simple and effective, it would be preferable to eliminate the undesirable characteristics associated with such filters without making them appreciably more complicated or destroying their effectiveness.

It is, therefore, an object of this invention to provide an improved coffee maker filter which will substantially lessen filtering time.

It is an additional object of this invention to provide a porous type filter which will rapidly and effectively filter a coffee solution containing finely ground coffee.

It is a further object of this invention to provide an improved porous type filter which will reduce the deposition of gelatin-like mineral deposits upon the filter screen.

It is a further object of this invention to provide a simple, inexpensive addition to the conventional porous filter whereby the retardent effect on filtering time of powdered coffee and mineral content of the water is substantially reduced or eliminated.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a sectional view taken through the axis of the upper vessel of a coffee maker employing the filter of the instant invention;

Fig. 2 is a perspective view of the coffee maker filter;

Fig. 3 is an exploded view in perspective of the filter screen assembly;

Fig. 4 is a sectional view of an alternative embodiment of the invention; and

Fig. 5 is a cutaway portion of an alternative embodiment in perspective.

The improvement of the instant invention is disclosed and described below as applied to a porous filter of the type using a stainless steel screen as a filtering element. A filter of this type is disclosed in detail in the inventor's co-pending United States patent application, Serial No. 427,437. It should be understood that the improvement has more general utility being suitable for use with any porous type filter whether paper, cloth, plastic, ceramic or metal.

Referring now to the drawings, and specifically to Figs. 1 and 2, the filter is shown as adapted for use in a vacuum-type coffee maker. Fig. 1, a sectional view of an upper vessel 11 of a coffee maker, shows the filter in operation. The upper vessel 11 is of conventional construction and terminates in a well defined by circular side wall 12 and a bottom 13. A tube 14 has its upper end connected to the bottom 13 as by the tube flange 15 and the retaining flange 16 which is threadedly received on the upper end of tube 14. A gasket member 17 is secured against the bottom 13 by the flanges 15 and 16 to prevent any leakage therethrough. A large rubber gasket not shown is normally provided encircling the circular side wall 12 and the retaining flange 16 to permit sealing engagement between the upper and lower vessels of the coffee maker. The tube 14 tapers as it extends downwardly from flange 16 terminating at a lower end 18.

In the operation of a vacuum-type coffee maker, the water heated in the lower vessel is forced upwardly through tube 14 into the upper vessel 11. In the upper vessel, the coffee grounds and hot water are brought together to produce the coffee liquor. A filter generally designated as 20 must be provided to permit the coffee liquor to return to the lower vessel while retaining the coffee grounds in the upper vessel.

Referring to Fig. 3, a filter screen assembly 21 is shown in an exploded perspective view. The screen assembly 21 is of circular shape having a porous member 22 which is adapted to permit the flow of coffee liquor therethrough while obstructing the passage of grounds from the upper vessel 11 to the tube 14. The porous member 22 may be made of paper or cloth but in the instant embodiment it is formed of drawn stainless steel wire woven to provide a screen of the order of 200 mesh. While the dimensions of the openings in the screen may vary considerably, a screen formed of stainless steel wire, .0021 of an inch in diameter and with about 33.6 percent open space has been found to be very satisfactory.

For the purpose of maintaining the screen 22 substantially flat, an annular ring member 23 is secured to its periphery. The annular ring 23 is made up of a pair of flat retaining flanges 24 joined together along their outer edges and between which the screen 22 is gripped. The annular ring 23 is also provided with an upwardly and outwardly extending gasket flange 25. The screen assembly 21 contains a supporting frame 26 which is assembled adjacent to screen 22 and serves as a support therefor. The support frame 26 comprises a hub portion 27, annularly spaced radially extending spokes 28 and an annular rim 29. The annular rim 29 serves as a support for a number of locating tabs 30 which extend downwardly and inwardly. The hub 27 has a hole 31 formed therein which is adapted to receive an assembly means as will be explained below. The hole 31 is of the same diameter as a hole 22a formed in the center of screen 22. The screen 22 and support frame 26 are retained in assembled relation by means of an annular gasket member 32. As can be seen in Fig. 1, the gasket member 32 is substantially circular in cross section having a groove 33 formed in its inner face. The groove 33 is designed to receive the retaining flanges 24 and the annular rim 29 of the support frame 26. The flange 25 on the ring member 23 prevents the gasket member 32 from being displaced relative to the screen assembly 21. The gasket member 32 has the primary function of providing sealing engagement between the screen 22 and the upper bowl 11. With the screen 22 and support frame 26 in their assembled positions, the holes 22a and 31 are axially aligned.

Referring to Fig. 2, the complete filter 20 is shown in its assembled relation. In addition to the filter screen assembly 21 described above, the filter is made up of an elongated assembly rod 34, a retaining spring 35 and an inverted cup member 36. The cup member 36, which may be formed of any suitable material such as stainless steel or aluminum, has a bottom portion 37 and depending cylindrical side walls 38. With the cup 36 in the inverted position, the portion referred to as the bottom is, of course, the uppermost part of the cup. The lower edges of side walls 38 terminate in a lip which lies in a single plane. With the cup so formed, the lip of cup 36 may be brought into continuous contact with the plane surface of the screen 22. In some instances where the screen 22 is made of fragile material, it may be desirable to provide a lip flange 39 as shown in Fig. 1 to prevent mutilation of the filter screen.

A rectangular opening 40 is cut out of the cylindrical wall 38 adjacent to the lower lip of cup 36. In the particular embodiment described, the rectangular opening is approximately ⅛" high and 5/16" long. The bottom 37 of the cup 36 has a large number of small holes 41 formed therethrough. In the selected embodiment, the holes 41 are .047 inch in diameter. The bottom 37 of the cup member has one large diameter hole 42 formed in the center thereof. The hole 42 is of such size as to slidably receive the elongated assembly rod 34 while not permitting passage of spring 35 into the hole.

When the filter 20 is in the position shown in Fig. 1, the filter screen assembly 21 and the cup member 36 are positioned on the assembly rod 34 at a point slightly above its mid-point. The rod 34 has a hook 43 formed at its lowermost end which is adapted to engage the lower end 18 of tube 14. In order that the assembly rod 34 will be vertically positioned in the center of the upper vessel 11, a bend 44 is provided to compensate for the axial displacement of any selected portion of tube end 18 from the axis of vessel 11. The rod 34 is additionally deformed at bend 44 so as to retain the filter screen assembly 21 and cup 36 assembled to the rod 34 during cleaning, washing or periods of non-use.

The upper end of rod 34 is shaped to define a handle portion 45. The spring member 35 which is slidably received on rod 34 is retained thereon by means of the upper end of spring 35 which is formed to pass through a hole 46 extending diametrically through rod 34 to prevent axial movement of the upper end of the spring relative to the rod 34. The lower end of spring 35 is seated against the bottom portion 37 of the cup 36. On assembly of the filter 20 to the upper vessel 11, the filter is passed through the open mouth of the upper vessel so that the gasket 23 engages the bottom of the upper vessel and encircles the well in the bottom thereof. The centering tabs 30 projecting from the screen assembly 21 loosely contact the side walls 12 of the well and aid in assembling the filter within the upper vessel 11. The handle portion 45 is then depressed against the action of spring 35 until the hook 43 has been extended below the end 18 of the tube 14. A small sidewise movement of the handle 45 then engages hook 43 with the end 18 to complete the assembly of the filter 20 to the upper bowl 11. In the assembled position, spring 35 maintains the gasket 32 in intimate engagement with the vessel 11.

In the normal operation of a filter of this type, a quantity of hot water is first forced upwardly through the porous member 22 into the upper vessel 11. The cup member 36, which represents the basic element of the instant invention, has a tendency to obstruct the upward flow of water through the filter. However, the opening 40 serves as a passage through which the water forced upwardly from the lower vessel may pass. In some instances, it has been found advantageous to employ additional openings 40 to permit a greater rate of flow of water upward. If it is desired to further increase the flow rate through to cup 36, a plurality of holes 41 may be provided as shown in Fig. 2. The provision of the large number of holes 41 creates a less turbulent transfer of water to the upper vessel 11 than might otherwise be achieved at high flow rates. It should be understood that proper control of the heating of the lower vessel can control the flow rate into the upper vessel so as to eliminate the need for the holes 41. As will be explained below, the holes 41 must be of such member and dimension as to leave undisturbed the action of opening 40 during the filtering operation.

After the hot water and coffee have been brought together in the upper bowl 11, the filter must allow the coffee liquor to be drawn downwardly through tube 14 by virtue of the vacuum in the lower vessel while retaining the grounds in the vessel 11. Fig. 1 pictures this process intermediately of its completion. As the coffee liquor passes through the filter 20, the holes 41 become clogged with grounds so as to be inoperative during this portion of the coffee making cycle. The opening 40 then remains as the only passage in cup 36 through which coffee liquor may flow to reach the portion of filter screen 22 covered by the cup 36. Since substantially the entire flow of liquor through filter 20 is concentrated through the relatively small opening 40 in the wall 38, a high velocity stream of liquid is induced to flow therethrough. The elongated arrows of Fig. 1 show the direction of this high velocity stream and the results produced by it. Inasmuch as the hole 40 is immediately adjacent to the surface of screen 22, the high velocity stream passing through the hole 40 prevents the accumulation of any grounds or gelatin-like material on the upper surface of the screen 22. In addition, it maintains such turbulence within the entire cup that there is little settling out of the grounds inside the cup 36 as compared elsewhere in vessel 11. It should be understood that only a relatively small area of unobstructed filter screen is necessary for rapid passage of the coffee liquor therethrough. As can be seen in Fig. 1, the coffee grounds are deposited both outside and inside of the cup member 36. In practice it has been found that if the cup 36 is made of sufficient height and diameter, the high velocity stream will maintain a portion of the screen 22 unobstructed in spite of substantial deposits of grounds within the cup 36.

Considering the perspective view of Fig. 2, it will be noted that the cup 36 does not completely cover the screen 22 leaving an uncovered portion 22b. This exposed portion 22b of screen 22 is provided to filter the last few ounces of coffee liquor contained in the upper vessel 11. It has been found that the velocity of the stream through opening 40, which is dependent to a large extent on the lower vessel vacuum and the head of coffee in the upper vessel, decreases to an ineffective value just prior to completion of the filtering. In order to rapidly filter the remaining few ounces, when employing an upper vessel of the shape shown in Fig. 1, it has been found to be desirable to leave a portion of the screen 22b available outside of the cup 36 to perform this terminal filtering. It should be understood that by modifying the shape of the upper bowl 11, it would be possible to complete substantially all the filtering before the stream velocity reached the ineffective value. This change would render useless the uncovered portion 22b of the filter screen 22.

There are many variations of the basic embodiment shown in Figs. 1, 2 and 3 which may be employed. The basic requirement of the cup 36 is that it provides a means for creating turbulence adjacent the filter screen 22. Such turbulence prevents the deposit of grounds or the gelatin-like material on the screen, both of which would clog the openings in the screen and prevent effective filtering.

In the embodiment of Fig. 4, a nozzle member 47 is mounted in the cup opening 40 by any suitable means such as braising or soldering and is disposed in a horizontal plane and is angularly positioned with respect to the walls 38 of the cup 36. This angular positioning of the nozzle 47 directs the high velocity stream of coffee liquor in a more tangential or circular direction relative to the cup 36 and thereby creates additional turbulence throughout the volume enclosed by the cup. The same effect can be created by merely axially slitting the lower edge of wall 38 and bending a portion of the wall inwardly adjacent to the slit. This inward deformation creates a similar nozzle effect.

It should be evident that there are many structural variations which may be applied to the cup opening 40 to achieve the desired turbulence at the surface of screen 22. In addition, the cup member 36 wihch is shown as having cylindrical walls and horizontal bottom may be of conical, spherical or any number of desired shapes. The cup 36 need only enclose a volume above the filter screen 22 within which the turbulent filter cleaning action may be created.

As was pointed out above, the holes 41 are designed to lessen the turbulence and bubbling as the water enters the upper vessel 11 through the filter 20. It should be understood that other suitable means may be employed to permit the water to pass rapidly upward through the filter of the instant invention. For example, the use of a retaining spring 35 of less strength would permit the cup member 36 and screen assembly 21 to be more readily displaced upwardly and allow the water to pass around the edge of the filter assembly. In the embodiment of Fig. 5, an alternative form is shown for the holes 41. In this form of the cup 36, a plurality of protuberances 48 are formed in the bottom 37 of the cup 36. These upwardly projecting protuberances 48 present a number of vertically disposed openings 49.

The openings 49 serve essentially the same purpose as the holes 41, i. e., they permit upwardly flowing water and steam to pass through the filter with a minimum amount of turbulence. The deformations 48 which have been created so that the openings 49 fall substantially in the vertical plane are designed to cause a swirling motion in the water passing therethrough. When the bubbles of steam and water are directed horizontally, they approach the surface of liquid in the upper vessel with a lower vertical velocity. This aspect is sometimes desirable when operating the upper vessel near its capacity.

While there have been shown and described particular embodiments of the present invention, it will be apparent to those skilled in the art that various modifications may be made without departing from the invention in its broader aspects and it is, therefore, aimed in the appended claims to cover all such changes and modifications as fall within the true spirit and scope of the present invention.

What is desired to be secured by Letters Patent of the United States is:

1. A filter of the type adapted for use in a vacuum coffee maker having an upper and a lower vessel comprising a porous screen, an annular ring member assembled in gripping relation to the periphery of said porous screen, means for mounting said ring in sealed engagement with said lower vessel with said screen in obstructing relation to the discharge opening of said upper vessel, an inverted cup member having a bottom and a wall terminating in a lower lip which is in engagement with said screen, said cup member having said lip spaced inwardly from said ring member so said cup member is covering only a part of said screen, said mounting means being positioned to bias said cup into engagement with said screen, and said cup being formed with an opening in said wall adjacent said screen and a series of holes in said bottom.

2. The filter of claim 1 wherein said opening is provided with a nozzle member extending from said opening at an angle to said wall.

3. A filter adapted for use in a vacuum coffee maker of the type having an upper and lower vessel comprising a metallic filter screen, means mounting said filter screen in obstructing relation to the discharge opening in said upper vessel, an inverted cup-shaped member having a horizontal bottom, a cylindrical depending wall and a lower lip portion, said bottom being provided with a plurality of holes of such diameter that coffee grounds will readily pass therethrough, said wall being provided will not readily pass therethrough said wall being provided of said holes passing coffee grounds and creating a cleaning action across the filter screen, said opening being located adjacent said lip, and assembly means securing said lower lip in engagement with said filter screen.

4. A filter adapted for use in a vacuum coffee maker of the type having an upper and lower vessel comprising a metallic filter screen, means mounting said filter screen in obstructing relation to the discharge opening in said upper vessel, an inverted cup-shaped member having a horizontal bottom, a cylindrical depending wall and a lower lip portion, said bottom being provided with a plurality of holes of such diameter that coffee grounds will not readily pass therethrough, said wall being provided with at least one opening of such area as to pass the liquid contained in said upper vessel in a short time, said opening being located adjacent said lip, assembly means securing said lower lip in engagement with said filter screen, said cup covering only a portion of the filtering area of said filter screen whereby a portion of said filtered liquid will pass directly from said upper vessel to said lower vessel through the uncovered portion of said filter screen without entering said cup.

5. A coffee maker filter comprising a porous filter screen, an annular ring member surrounding said filter screen and gripping the periphery thereof to maintain said screen in a flat position, an inverted cup-shaped member having a lower lip defining the mouth of the cup, said cup-shaped member being formed with an opening in the wall of said member adjacent said mouth, an assembly rod extending through said cup and said screen to position said cup-shaped member centrally on said filter screen with said lower lip in engagement with said filter screen, said lip being spaced inwardly from said rim to leave a portion of said filtering screen uncovered by said cup whereby the liquid may be filtered by the portion of the filter screen between said lip and said annular ring.

6. The coffee maker filter of claim 5 having a spring secured to said assembly rod to bias said cup against said screen.

7. The filter of claim 3 wherein said assembly means comprises an assembly rod extending through said screen and said cup-shaped member, and a spring secured to said rod to bias said cup against said screen and to bias said filter screen into engagement with said upper vessel, said spring permitting said cup-shaped member and said spring to be biased out of obstructing relation when liquid is forced into said upper vessel through said discharge opening.

References Cited in the file of this patent

UNITED STATES PATENTS

| | | |
|---|---|---|
| 1,794,596 | Dowling | Mar. 3, 1931 |
| 2,059,636 | Flavin | Nov. 3, 1936 |
| 2,464,843 | Becher | Mar. 22, 1949 |

UNITED STATES PATENT OFFICE
CERTIFICATE OF CORRECTION

Patent No. 2,864,504                                                                   December 16, 1958

Ivar Jepson

It is hereby certified that error appears in the printed specification of the above numbered patent requiring correction and that the said Letters Patent should read as corrected below.

Column 4, line 58, for "member" read -- number --; column 5, line 64, for "wihch" read -- which --; column 6, line 58, strike out "will readily pass therethrough, said wall being provided"; line 59, after "therethrough" insert a comma; same line 59, after "provided" insert -- with at least one opening several times as large as each --.

Signed and sealed this 14th day of April 1959.

(SEAL)
Attest:

KARL H. AXLINE
Attesting Officer

ROBERT C. WATSON
                                                                                 Commissioner of Patents